United States Patent [19]

Kiyotaki

[11] Patent Number: 5,767,951
[45] Date of Patent: Jun. 16, 1998

[54] PHOTOGRAPHIC PRINTING APPARATUS

[75] Inventor: Yoshihiro Kiyotaki, Wakayama, Japan

[73] Assignee: Noritsu Koki Co., Ltd., Wakayama, Japan

[21] Appl. No.: 648,961

[22] Filed: May 17, 1996

[30] Foreign Application Priority Data

May 22, 1995 [JP] Japan ................................. 6-145169
Dec. 21, 1995 [JP] Japan ................................. 6-349772

[51] Int. Cl.$^6$ ........................... G03B 27/54; G03B 27/72
[52] U.S. Cl. ......................................... 355/71; 355/67
[58] Field of Search ................................. 355/67, 71

[56] References Cited

U.S. PATENT DOCUMENTS 5,430,523   7/1995   Tanibata ........................... 355/32
5,488,450   1/1996   Tanibata ........................... 355/38

*Primary Examiner*—R. L. Moses
*Assistant Examiner*—Shival Virmani
*Attorney, Agent, or Firm*—Oblon, Spivak, McClelland, Maier & Neustadt, P.C.

[57] ABSTRACT

A photographic printing apparatus includes a light source for exposure, an optical unit for projecting an image carried on a negative film onto a photosensitive material at a predetermined magnification, a first shutter for exposure time control disposed between the light source and the negative film, and a second shutter for light shielding disposed between the optical unit and the photosensitive material. The first and second shutters are controlled such that their opening operations end simultaneously and their closing operations start simultaneously. Alternatively, the first and second shutters are controlled such that the second shutter is closed when the first shutter continues its closed state for 60 seconds or longer.

10 Claims, 12 Drawing Sheets

FIG. 2

| SAMPLE No | (1) | (2) |
|---|---|---|
| | REF. LAMP IRRADIATION :2H LENS COVER :OPEN | REF. LAMP IRRADIATION :1MIN. LENS COVER :CLOSED |
| ZOOM LENS FULLY OPENED (COMMAND VALUE:0) | × | × |

| SAMPLE No | (3) | (4) | (5) | (6) | (7) |
|---|---|---|---|---|---|
| | REF. LAMP IRRADIATION :1H LENS COVER :CLOSED | REF. LAMP IRRADIATION :10MIN. LENS COVER :CLOSED | REF. LAMP IRRADIATION :5MIN. LENS COVER :CLOSED | REF. LAMP IRRADIATION :1MIN. LENS COVER :OPEN | REF. LAMP IRRADIATION :1MIN. LENS COVER :CLOSED |
| ZOOM LENS APERTURE: 3 3/4 (COMMAND VALUE:15) | × | × | × | × | ○ | ns apparatuses employ a technique for turning on and off a
PHOTOGRAPHIC PRINTING APPARATUS

BACKGROUND OF THE INVENTION

1. Field of the Invention

The present invention relates to a photographic printing apparatus, and more particularly to a photographic printing apparatus having a shutter apparatus for exposure which comprises a shutter for exposure control and a shutter for light shielding.

2. Description of the Related Art

A shutter apparatus of a photographic printing apparatus is disposed along an optical path. The shutter apparatus, which provides light shielding when in the closed state, is opened during exposure. Except for periods of exposure, the shutter is closed at all times so as to prevent printing paper from being undesirably exposed. Through accurate opening/closing operation of the shutter apparatus, a period of time during which the printing paper is exposed (hereinafter referred to as an "exposure time") is controlled. Examples of shutter apparatuses used in conventional photographic printing apparatuses will be described below.

In the apparatus disclosed in Japanese patent publication (kokoku) No. 37-17733 entitled "Slide Film printing and Editing Apparatus", exposure time is controlled by turning on and off a light source. This apparatus comprises a rotary switch for alternately carrying out actuation of an electric timer which turns on the light source for a predetermined exposure time and feed of a photosensitive material over a distance corresponding to the length of each frame. The apparatus also comprises indicator lamps for indicating the steps of a printing/editing process so as to facilitate secure printing operation. A dark box which accommodates a photosensitive material to be shielded from light is provided with a light shielding shutter which functions as a projecting plate as well. In this general printing apparatus, a negative film, a lens, and a shutter are disposed along the optical path in this order from the light source.

In the apparatus disclosed in Japanese patent Application Laid-Open (kokai) No. 48-71629 entitled "photographic Copying Apparatus", electromagnets are connected to a pair of aperture blades, which rotate in opposite directions so as to provide a proper light intensity. When a switch timer is operated, an electromagnet control circuit is brought into an on state, so that light projected onto a film is supplied to a photoelectric transducer. By controlling the electromagnets using electromotive force produced by the photoelectric transducer, the aperture blades are opened and closed properly at a high speed. The aperture formed by the pair of aperture blades may function as a shutter. Alternatively, an additional shutter may be disposed. In this printing apparatus, a shutter, a negative film, and a lens are disposed along the optical path in this order from the light source.

In the apparatus disclosed in Japanese patent Application Laid-Open (kokai) No. 52-126224 entitled "photographic printing Apparatus", a lens assembly is provided in which a plurality of lens supporting plates supporting various lenses are moved into and retracted from the optical path, thereby varying a print magnification. This apparatus is provided with two shutter members which are moved alternately and individually along a common path so as to close an optical window along the optical path. By closing and opening this optical window, exposure time can be controlled accurately at a high speed. In this printing apparatus, a negative film, a lens, and a shutter are disposed along the optical path in this order from the light source.

In the apparatus disclosed in Japanese patent Application Laid-Open (kokai) No. 57-167021 entitled "print Density Compensating Apparatus for an Enlarger", there is provided a head including a light source, a shutter, a negative film, and a projection lens. The position of the head is detected through reading, with a light receiving element, an optical code formed on a side surface of a column stood on a photosensitive-material support base so as to be oriented parallel to the optical path. The shutter is operated based on the detected position of the head so as to control exposure. In this printing apparatus, a filter, a shutter, a diffusion box, a negative film, and a projection lens are disposed along the optical path in this order from the light source.

In the apparatus disclosed in Japanese patent Application Laid-Open (kokai) No. 50-62633 entitled "Automatic Controller for Color photograph printing and Exposure", a cut filter is disposed in the vicinity of a lamp serving as a light source so as to stabilize the structure. Further, a holding circuit for holding a negative film density detected by an illuminance detector is provided in a light adjusting circuit. By using the negative film density held by the holding circuit, the illuminance is maintained constant without being affected by the insertion of the cut filter. In this printing apparatus, a first shutter, a cut filter, a diffusion box, a condenser lens, a negative film, an objective lens, and a second shutter are disposed along the optical path in this order from the light source. The first shutter is opened for photometry in a state in which the second shutter is closed. The second shutter is opened during a period of exposure only and serves as a main shutter for determining the amount of light irradiated onto printing paper. The first shutter is closed when photometry or exposure is not being carried out, thereby protecting the cut filter, etc., from heat generated by the lamp.

It has been desired for photographic printing apparatuses to handle a photosensitive material having a higher sensitivity, or to improve processing performance so as to reduce the cost of the apparatus. Therefore, for such printing apparatuses, shutter apparatuses have been developed which have excellent light shielding performance, which open and close accurately at higher speeds, and which have simplified structures. Among them, a shutter apparatus comprising both a shutter for exposure control and a shutter for light shielding will now be described.

In the apparatus disclosed in Japanese patent Application Laid-Open (kokai) No. 3-172832 entitled "Shutter Apparatus for Exposure Used in a photographic printing Apparatus", a first shutter, a negative film, an optical unit, a second shutter, and a printing paper are disposed along the optical path in this order from the light source. The first shutter is opened during a period of exposure only and serves as a main shutter for determining the amount of light irradiated onto printing paper. Since this first shutter is disposed in the vicinity of the light source, it can be opened and closed stably at high speeds. The second shutter is closed when exposure is not carried out, thereby preventing the printing paper from becoming fogged due to light from the light source or light from the outside. The second shutter is opened before the first shutter is opened, and is closed after the first shutter is closed.

In shutter apparatus disclosed in Japanese patent Application Laid-Open (kokai) No. 3-172832, exposure is performed continuously for each order corresponding to a customer or a film. Therefore, the second shutter for light shielding is closed whenever exposure for each order has been completed.

As described above, conventional photographic printing apparatuses employ a technique for turning on and off a lamp serving as a light source so as to control exposure time, thereby stabilizing the amount of light used for exposure, as disclosed in the apparatus disclosed in Japanese patent publication (kokoku) No. 37-17733 entitled "Slide Film printing and Editing Apparatus". However, to meet the requirement for improved exposure accuracy, a shutter is commonly used to control exposure time, as disclosed in Japanese patent Application Laid-Open (kokai) No. 57-167021 entitled "print Density Compensating Apparatus for an Enlarger".

To cope with increased sensitivities of photosensitive materials, the layout of a shutter for exposure control has been improved and the speed of opening/closing operation has been increased, as disclosed in Japanese patent Application Laid-Open (kokai) No. 48-71629 entitled "photographic Copying Apparatus", and in Japanese patent Application Laid-Open (kokai) No. 52-126224 entitled "photographic printing Apparatus". Further, a light shielding shutter has been incorporated to provide a light shielding function using a simple structure, as disclosed in Japanese patent Application Laid-Open (kokai) No. 50-62633.

Recently, highly sensitive photosensitive materials have been used, and improvement of processing performance and reduction of equipment costs have been demanded. Therefore, the combined use of a shutter for exposure control and a shutter for light shielding is one proper solution for providing a shutter apparatus which has a simplified structure and which has improved light shielding performance and increased opening/closing speeds.

In the apparatus disclosed in Japanese patent Application Laid-Open (kokai) No. 50-62633 entitled "Automatic Controller for Color photograph printing and Exposure", exposure is controlled by a shutter provided in the vicinity of a photosensitive material. Since the shutter must cover the entire surface of the photosensitive material within an exposure region and therefore is larger than the shutter provided in the vicinity of the light source, the opening and closing motion of the shutter provided in the vicinity of the photosensitive material is slow. When such a large shutter is used, there is a possibility that its closing operation for light shielding becomes unstable as its opening/closing speed increases.

To overcome the above-described problem, in the apparatus disclosed in Japanese patent Application Laid-Open (kokai) No. 3-172832 entitled "Shutter Apparatus for Exposure Used in a photographic printing Apparatus", the first shutter serving as a main shutter is disposed in the vicinity of the light source so as to control exposure time, and the second shutter for light shielding is disposed in the vicinity of a photosensitive material. The second shutter is controlled in an improved manner not only to provide light shielding but also to reduce useless operation, thereby preventing operation of the second shutter from interfering with exposure time. The first shutter for exposure control present in the vicinity of the light source is fixed stably, and the first shutter can provide light shielding even when its size is small. Accordingly, the shutter can be opened and closed stably at high speeds.

Complete light shielding is required, especially when a photosensitive material having a high sensitivity undergoes printing. Therefore, it is desirable to close the second shutter for as long as possible. It is desired to open and close the second shutter whenever the first shutter for exposure control is opened and closed. However, since the second shutter for light shielding disposed in the vicinity of a photosensitive material is larger than the first shutter for exposure control provided in the vicinity of the light source, the second shutter takes a longer period of time to complete its opening and closing operations compared with the first shutter. From the viewpoint of performance of the exposure process, it is desired to maintain the second shutter for light shielding opened during the entire time when the photographic printing apparatus is operated. However, this would produce fog due to light from the outside, etc.

To solve this problem, in conventional apparatuses, the second shutter is opened and closed to follow precisely the operation of the first shutter, taking into consideration both light shielding performance and exposure efficiency. In this case, the second shutter for light shielding is closed whenever exposure for one order is completed. However, this cannot prevent exposure time from being affected.

That is, since the first shutter is opened after completion of the opening operation of the second shutter and the second shutter is closed after completion of the closing operation of the first shutter, the period of time between a certain closing operation and a subsequent opening operation of the second shutter is long, which may interfere with the cycle of the exposure process. Since the costs of photography have been reduced more and more and the amount of consumption of photographs has been increased considerably, in many cases a large number of photographs are processed continuously. Therefore, improvement of processing performance has been one of important targets.

Further, the opening/closing operation of the second shutter is controlled by using a signal from a switch associated with the first shutter, before opening operation of the first shutter is started and after completion of closing operation of the first shutter. The opening/closing operation of the second shutter depends on the first shutter and the second shutter cannot be opened and closed independently. This makes maintenance inconvenient and causes other problems.

SUMMARY OF THE INVENTION

An object of the present invention is to provide an improved photographic printing apparatus which has a shutter apparatus for exposure consisting of a shutter for exposure control and a shutter for light shielding, which shortens a period of time required for the exposure process and which provides improved light shielding performance while improving maintainability.

To accomplish the above objects, the present invention provides a photographic printing apparatus having a shutter apparatus for exposure, in which a first shutter for exposure control is disposed along an optical path between a light source and a negative film, and a second shutter is disposed along the optical path between an optical unit and a photosensitive material. The optical unit projects an image carried on the negative film onto the photosensitive material at a predetermined magnification. The first shutter for exposure control and the second shutter for light shielding are controlled to simultaneously complete their opening operations and to simultaneously start their closing operations.

The present invention also provides a photographic printing apparatus having a shutter apparatus for exposure, in which a first shutter for exposure control is disposed on an optical path between a light source and a negative film, and a second shutter is disposed along the optical path between an optical unit and a photosensitive material. The optical unit projects an image carried on the negative film onto the photosensitive material at a predetermined magnification. The second shutter for light shielding is closed when the first shutter is closed continuously for a predetermined period of time.

A description will be given of operation of the shutter apparatus for a photographic printing apparatus according to the present invention in which the first and second shutters are controlled to simultaneously complete their opening operations and to simultaneously start their closing operations. FIG. 1 is a timing chart showing opening/closing operation of the shutter apparatus according to the present invention. The left half of the timing chart shows an example of operation in which the first and second shutter simultaneously complete their opening operations. In response to a leading edge of an open request pulse for the second shutter, the second shutter starts its opening operation. The second shutter takes a period of time shown in FIG. 1 to complete its opening operation. Subsequently, an open request pulse for the first shutter is outputted while the second shutter continues its opening operation. In response to the open request pulse for the first shutter, the first shutter starts its opening operation, so that the first and second shutters simultaneously complete their opening operations at the beginning of a period for exposure.

In order to complete the opening operations of the first and second shutters simultaneously, it is sufficient to control their opening operations concurrently, if the first and second shutter open at the same speed. Generally, the second shutter disposed in the vicinity of the photosensitive material is larger than the first shutter disposed in the vicinity of the light source. Therefore, as shown in FIG. 1, the second shutter opens and closes slowly relative to the first shutter. Therefore, it is necessary to control the opening operations of the first and second shutters, taking into consideration the speed of opening operation of the second shutter.

The right half of the timing chart shows an example of operation in which the first and second shutter simultaneously start their closing operations. When the leading edge of a close request pulse for the second shutter for light shielding appears, the leading edge of a close request pulse for the first shutter for exposure control appears simultaneously. Thus, the first and second shutters start their closing operations simultaneously. Since the first shutter operates faster than the second shutter, the first shutter completes its closing operation first and the second shutter then completes its closing operation. When the first shutter completes its closing operation, the leading edge of a feed request pulse for requesting feed of the photosensitive material appears. In response to the leading edge of the feed request pulse, a feed motor is driven to transport the photosensitive material, thereby moving an exposed portion of the photosensitive material out of an exposure region. Subsequently, the apparatus is brought into a wait state, and the second shutter starts its closing operation.

In order to start the closing operations of the first and second shutters simultaneously, it is sufficient to control their closing operations concurrently. The transport of the photosensitive material may be started upon completion of the closing operation of the first shutter.

In the case where a light source requires a high operation voltage and its voltage/output characteristic has a rising edge transition period and a trailing edge transition period, it is possible to correspond these transition periods to the periods in which only the second shutter is in the open state. When the opening and closing operations of the first and second shutters are performed simultaneously, the efficiency of the exposure process can be increased. Further, it is possible to carry out selectively or alternately a plurality of modes in which the first and second shutters are operated simultaneously. This is expected to enhance processing performance.

Next, a description will be given of operation timing of control means for carrying out closing operation of the second shutter for light shielding used in the shutter apparatus for a photographic printing apparatus according to the present invention. Also, the maximum time of the second shutter being in the open state (hereinafter referred to as the "limit open time of the second shutter") will be described photosensitive materials are made of emulsions formulated such that in an ordinary exposure amount region, the density increases in proportion to an exposure amount (=light intensity×exposure time) so as to provide gradation photosensitive materials are not sensitive in a low exposure amount region, but in a high exposure amount region, they exhibit a characteristic in which variations in the density decrease. Therefore, in order to control the shutters efficiently, thereby providing sufficient light shielding performance without interfering with the time for exposure process, it is desired to control the closing operation of the second shutter for light shielding such that the amount of light which may be undesirably irradiated on the photosensitive material falls in the low exposure amount region in which the photosensitive material is not sensitized.

The low exposure amount varies depending on the sensitivities of photosensitive materials, and an amount of light which causes photosensitive materials to become fogged varies depending on the structures of photographic printing apparatuses and on the environments in which the photographic printing apparatuses are installed. From the relationship "Exposure amount=Light intensity×Exposure time", a limit open time of the second shutter for light shielding is determined. That is, a maximum exposure amount which falls within the low exposure amount region, which varies depending on photosensitive materials, i.e., a maximum exposure amount which does not cause fogging of photosensitive materials is determined. Based on the thus determined maximum exposure amount, the limit open time of the second shutter is determined. When the first shutter is continuously in the closed state for a predetermined period of time corresponding to the above limit open time, i.e., when exposure process is stopped for the predetermined period of time corresponding to the limit open time, the second shutter is closed, thereby preventing undesired fogging of photosensitive materials.

Evaluation was conducted on the light shielding performance of a print lamp housing with a zoom lens (experimental model) usable in the photographic printing apparatus according to the present invention. The method of evaluation and the results of the evaluation will be described below.

Light shielding performance was evaluated as follows. A gray exposure of V=0.2–0.3 was performed while light having a constant illuminance was irradiated uniformly onto the entire surface of equipment and parts required to have light shielding performance, by using a flood reflective lamp (300–500 W). The irradiation of light was performed under the conditions such that the illuminance was maintained at 15,000 lx for two minute so as to simulate an operating state, and was maintained at 5,000 lx for twelve hours so as to simulate a nonoperating state.

The above-described method was followed to evaluate the light shielding performance of the print lamp housing. Light having an illuminance of 5,000 lx was irradiated onto the print lamp housing at a constant position thereof, and light shielding performance was evaluated for the cases where the aperture of the zoom lens was in the fully opened state and was set to 3-¾, for the cases where the front cover of the zoom lens provided on the light-source side thereof was in the opened and closed states, and for the cases where light was irradiated for different periods of time.

A print lamp housing was installed in an experimental model, and a gray exposure of V=0.2–0.3 was performed. Upon completion of the exposure, the print lamp was turned off while a printing paper was left at the exposure region. Subsequently, the shutter was fully opened, and the flood reflex lamp was turned on and was then turned off after a predetermined period of time had elapsed. The printing paper was then subjected to development, and checked visually to determine whether or not fogging had occurred. The clearance between the zoom lens and the shutter was shielded by using EPDM (ethylene propylene dienemethylene) sealant. The chemical used in the test was FA (trade name, product of Fuji photo Co., Ltd.), and the printing paper was QA-5 (trade name, product of Konica Corp.).

FIG. 2 shows the results of evaluation on the light shielding performance of the print lamp housing of the photographic printing apparatus. When the aperture of the zoom lens was at the fully opened position (command value: 0), fogging occurred not only in the case where irradiation of light was continued for two hours with the lens front cover in the open state but also in the case where irradiation of light was performed only for one minute with the lens front cover in the closed state.

When the aperture of the zoom lens was set to 3-¾ (command value: 15), fogging occurred in the cases where irradiation of light was continued for one hour, for ten minutes, and for five minutes, with the lens front cover being in the closed state. However, fogging did not occur in the case where irradiation of light was performed for one minute with the lens front cover in the closed state.

Since the zoom lens used in the test was an experimental model, the evaluation of light shielding performance was performed in a state in which measures were not taken for complete light shielding. Due to the simple structure of the zoom lens, considerable amount of light enters inside through cooling slits, clearances of the lamp housing, etc. However, since no fogging occurred for one minute when the aperture was set to 3-¾, it is considered to be sufficient that light shielding is provided only when exposure process is stopped for 60 seconds or longer.

Therefore, in the photographic printing apparatus according to the present invention, closing operation of the second shutter is performed when the first shutter for exposure control is continuously in the closed state for 60 seconds or longer.

FIG. 3 shows an example of the density characteristic curve of a color printing paper. The curve shown in FIG. 3 was obtained by exposing a color paper SUPER FA7 (trade name, product of Fuji photo Film Co., Ltd.) using a color compensation filter of 3,000K, and processing the paper using CP-43FA2 (trade name, product of Fuji photo Film Co., Ltd.).

The horizontal axis represents an exposure amount (logarithm), and the vertical axis represents density. Generally, images are formed on a photosensitive material utilizing a range in which variations in the exposure amount are reproduced properly as tones. That is, images are formed in the rage where the slope of the characteristic curve is constant. In a region where the exposure amount is excessive, variations in the exposure amount are not reflected in the density. In a region where the exposure amount is less than a predetermined exposure amount, the sensitivity of the printing paper is very low, so that no image is formed. It is considered that when the first shutter for exposure time control is continuously in the open state for a period of less than 60 seconds, the exposure amount becomes less than the predetermined exposure amount, so that no fogging occurs.

preferably, a device for judging the kind of a photosensitive material being utilized is used as a means for detecting the sensitivity of the photosensitive material. That is, the sensitivity and other characteristics of a photosensitive material are recorded on the outer surface of a paper magazine or on the photosensitive material itself, as an uneven surface or as variations in density. These are read out mechanically, optically or magnetically so as to detect the kind of photosensitive material. In order to measure an amount of light which causes fogging on a photosensitive material, an illuminance meter or the like is preferably provided as a device for measuring the installation environment of the photographic printing apparatus. Preferably, means is provided to determine a predetermined period of time based on the thus obtained information. Control means is also provided to close the second shutter for light shielding when the first shutter for exposure time control is continuously in the closed state for the above-described predetermined period of time.

As described above, in the shutter apparatus for a photographic printing apparatus according to the present invention, opening operations of both the first shutter for exposure control disposed in the vicinity of the light source and the second shutter for light shielding disposed in the vicinity of a photosensitive material are completed simultaneously, and closing operations of the first and second shutters are started simultaneously. Since the second shutter is maintained in the closed state as long as possible, fogging is prevented reliably. In addition, a period of time required for the exposure process can be shortened. In a photographic printing apparatus provided with a high voltage lamp serving as a light source, the completion of opening operations or start of closing operations of the first and second shutters may be performed simultaneously in accordance with the output characteristics of the light source. This is expected to reduce the time for the exposure process. Since the photosensitive material is shielded from light reliably, it is expected to prevent super-high sensitive photosensitive materials from becoming fogged.

In the photographic printing apparatus according to the present invention, which has a first shutter for exposure time control and a second shutter for light shielding, control means is provided so as to perform closing operation of the second shutter when the first shutter for exposure control is continuously in the closed state for 60 seconds or longer. A predetermined period of time, which is a control condition for starting the closing operation of the second shutter, is determined based on the sensitivity of a photosensitive material and on the installation environment of the printing apparatus, and the second shutter having an operation speed slower than that of the first shutter is closed in accordance with the predetermined period of time. This enhances the performance of the exposure process while maintaining light shielding performance. It is especially possible to increase the processing performance of a photographic printing apparatus for printing a large amount of photographs in a continuous manner.

The photographic printing apparatus according to the present invention may comprise the above-described two kinds of control means, which are selectively used in accordance with the kind of photosensitive material to be processed and other factors. This reduces the time for the exposure process and provides complete light shielding. Since the photographic printing apparatus according to the present invention can be constructed by using the first shutter for exposure time control and the second shutter for light shielding, the performance for carrying out exposure process can be enhanced at low cost.

BRIEF DESCRIPTION OF THE DRAWINGS

Various other objects, features and many of the attendant advantage s of the present invention will be readily appreciated as the same becomes better understood by reference to the following detailed description of the preferred embodiments when considered in connection with the accompanying drawings, in which:

FIG. 2 is a table showing the results of evaluation on a print lamp housing of the photographic printing apparatus;

DETAILED DESCRIPTION OF THE INVENTION

Embodiments of the present invention will now be described with reference to the accompanying drawings.

Figure 1:
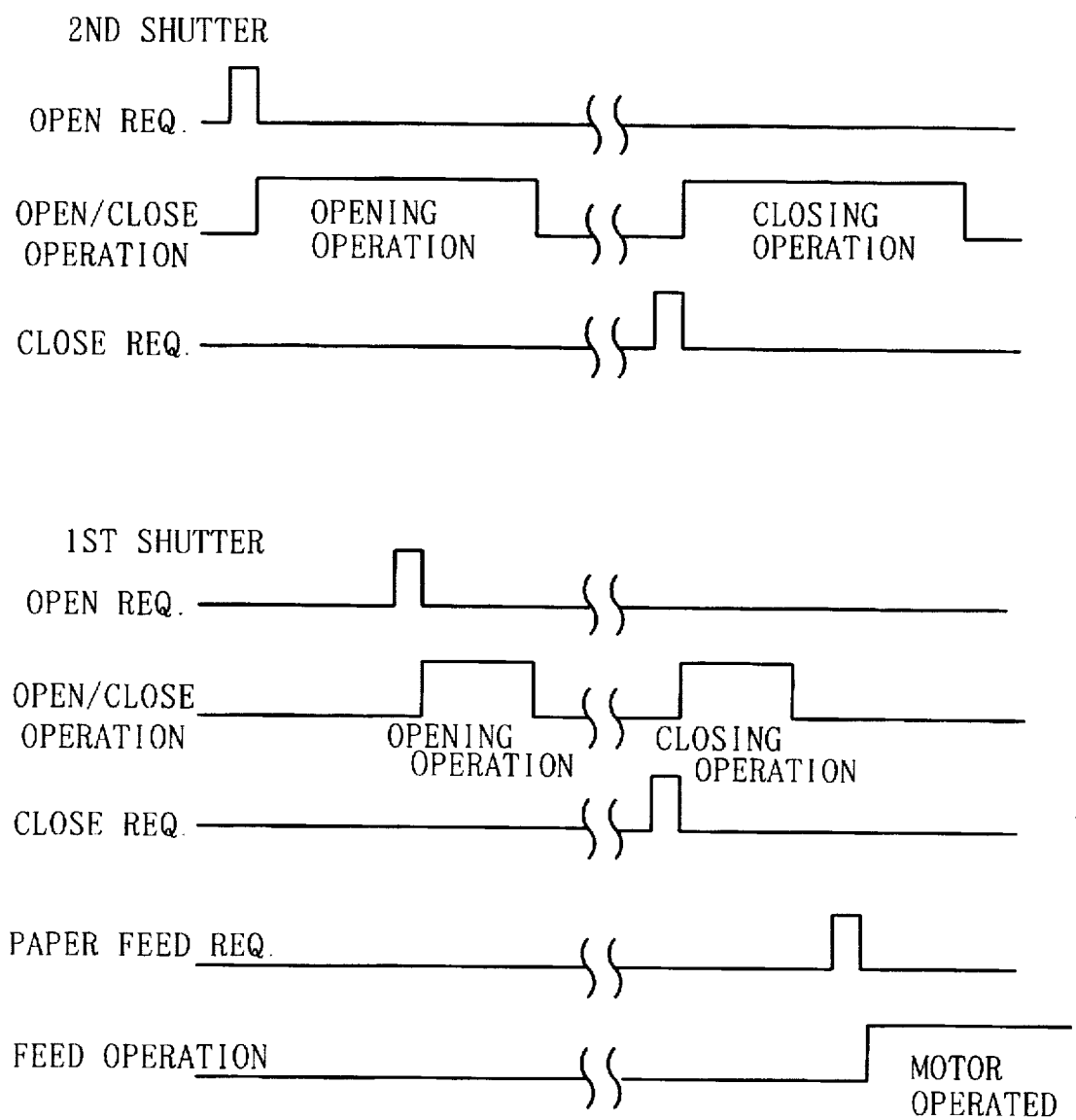
FIG. 1 is a timing chart showing opening/closing operation of a shutter apparatus for exposure used in a photographic printing apparatus according to the present invention.
Figure 3:
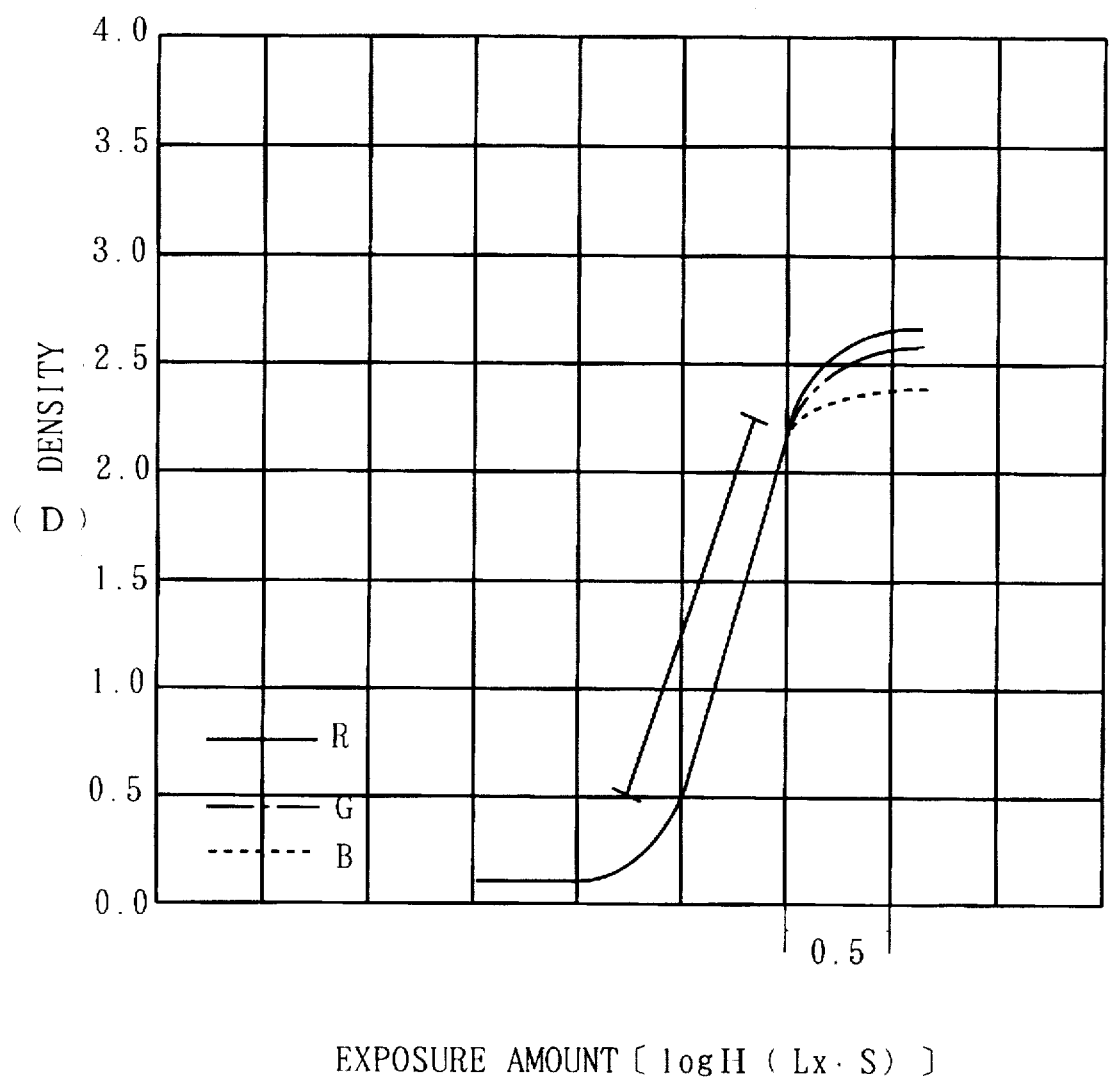
FIG. 3 is a graph showing an example of density characteristic curves of a color printing paper.
Figure 4:
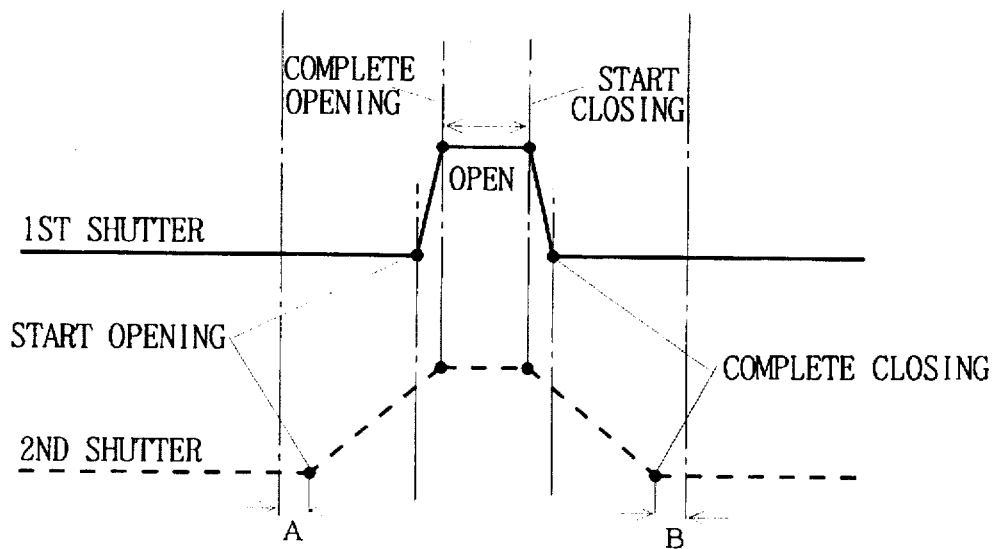
FIG. 4 is a timing chart showing opening/closing operation of the shutter apparatus used in the photographic printing apparatus according to the present invention.
Figure 5:
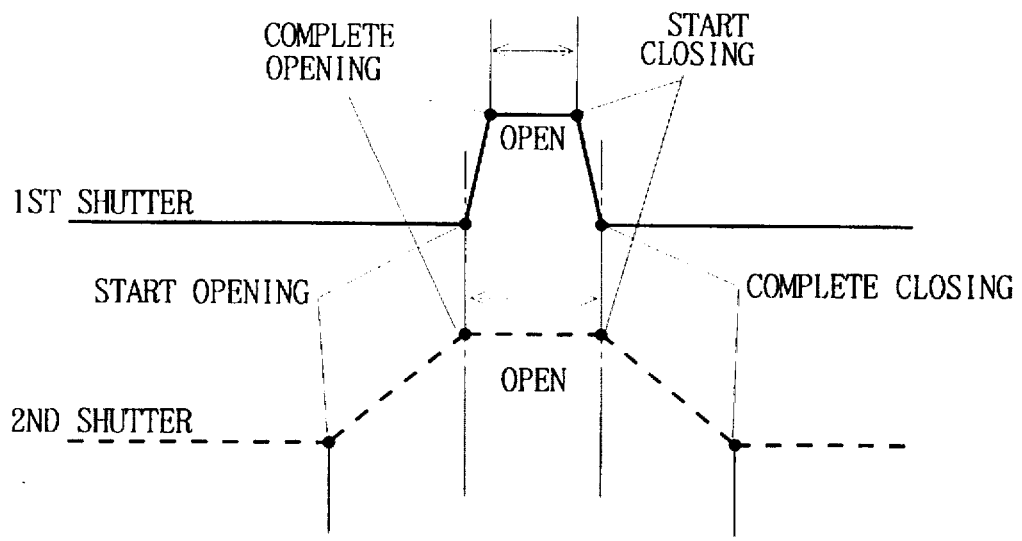
FIG. 5 is a timing chart showing opening/closing operation of the shutter apparatus used in a conventional photographic printing apparatus.

FIG. 4 is a timing chart showing opening/closing operation of the shutter apparatus used in the photographic printing apparatus according to the present invention. The photographic printing apparatus disclosed in Japanese patent Application Laid-Open (kokai) No. 3-172832 will be described as a comparative example. FIG. 5 is a timing chart showing opening/closing operation of the shutter apparatus used in the conventional photographic printing apparatus. Both the photographic printing apparatus of the present invention and the photographic printing apparatus of the comparative example have a first shutter for exposure time control disposed in the vicinity of a light source, and a second shutter for light shielding disposed in the vicinity of a photosensitive material. The first shutter can be operated at a speed higher than that of the second shutter.

In the comparative example, the opening/closing operations of the first shutter for exposure time control and the second shutter for light shielding are controlled in an interlock manner. When the exposure process is continuously performed, the opening operation of the second shutter is started upon completion of the closing operation of the first shutter which was opened for photometry, and the opening operation of the first shutter is started upon completion of the opening operation of the second shutter. The opening operation of the first shutter ends with a delay with respect to the completion of the opening operation of the second shutter. After a predetermined exposure time has elapsed, the closing operation of the first shutter is started, and the closing operation of the second shutter is started upon completion of the closing operation of the first shutter. The closing operation of the second shutter ends with a delay with respect to the completion of the closing operation of the first shutter. Therefore, the time required for each exposure process is equal to the period of time between the start of the opening operation of the second shutter and the end of the closing operation of the second shutter.

In the present embodiment, the first shutter for exposure time control and the second shutter for light shielding are controlled such that their opening operations end simultaneously and their closing operations start simultaneously, so that the period in which the first shutter is in the open state becomes equal to the period in which the second shutter is in the open state. First, the opening operation of the second shutter is started. Immediately before starting exposure, the opening operation of the first shutter is started, so that the opening operation of the first shutter ends simultaneously with completion of the opening operation of the second shutter. After a predetermined exposure time has elapsed, the closing operations of the first and second shutters are started, so that the first shutter having a faster operation speed completes its closing operation first, and then the second shutter completes its closing operation. As is apparent from the comparison between the present invention and the comparative example, the time required for exposure is shortened by the sum of periods A and B shown in FIG. 4. Therefore, it is expected that the speed of the exposure process increases.

As will become apparent from the following embodiments, in order to complete the opening operations of the first shutter for exposure time control and the second shutter for light shielding simultaneously, a precise control must be performed taking into consideration the speeds of the opening operations of these shutters. However, in order to start their closing operations simultaneously, it is sufficient to control their closing operations in a synchronized manner. The shutter apparatus for exposure used in the photographic printing apparatus according to the present invention is not limited to the embodiments, and the first shutter for exposure time control and the second shutter for light shielding may be controlled such that their opining operations end at the same time or their closing operations start at the same time.

Figure 6:
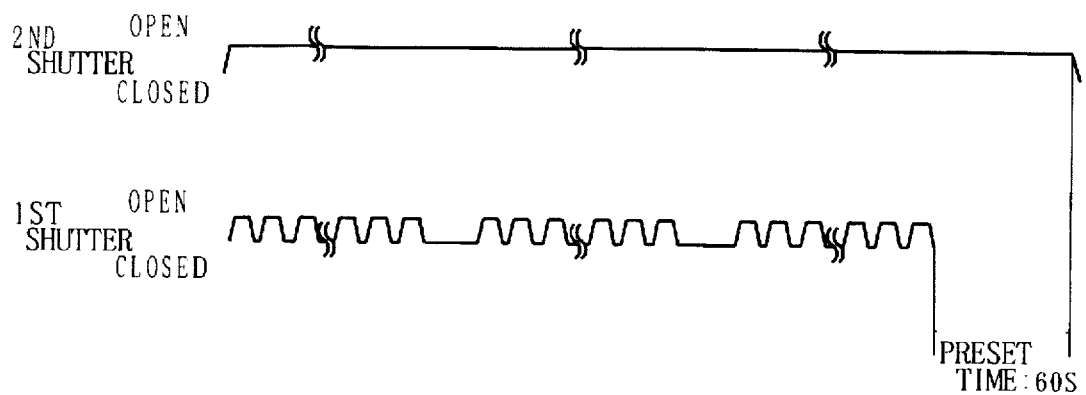
FIG. 6 is a timing chart showing opening/closing operation of the shutter apparatus used in the photographic printing apparatus according to the present invention.
Figure 7:
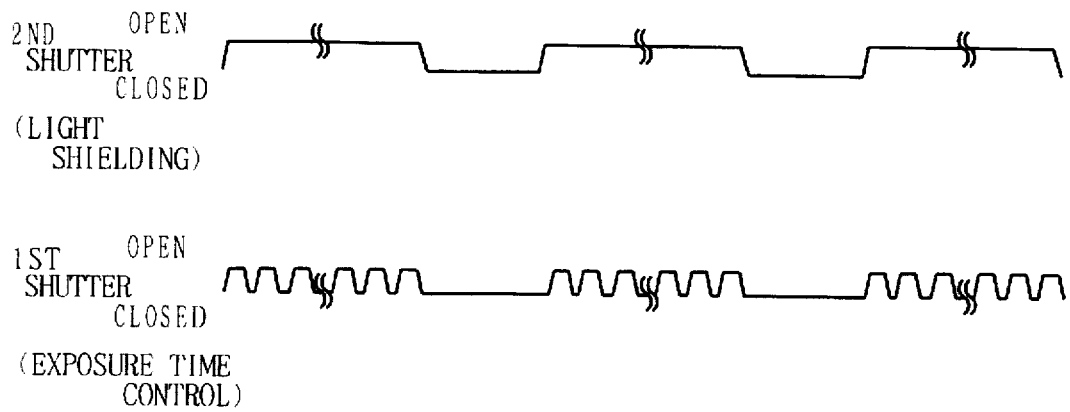
FIG. 7 is a timing chart showing opening/closing operation of the shutter apparatus used in the conventional photographic printing apparatus.

Next, the operation of the shutter apparatus used in the photographic printing apparatus will be described with reference to FIGS. 6 and 7. FIG. 6 is a timing chart showing opening/closing operation of the shutter apparatus used in the photographic printing apparatus according to the present invention. FIG. 7 is a timing chart showing opening/closing operation of the shutter apparatus used in a conventional photographic printing apparatus.

As shown in FIG. 7, exposure is generally performed continuously for each order corresponding to a customer or a film. Therefore, the second shutter for light shielding is closed whenever exposure for each order has been completed. Since the second shutter for light shielding has a large size to completely cover printing paper in the exposure region, a certain period of time is required to start its opening operation after completion of a previous closing operation.

In contrast, as shown in FIG. 6, in the shutter apparatus provided in the photographic printing apparatus according to the present invention, the second shutter for light shielding is maintained opened for a plurality of orders, and the second shutter for light shielding is closed upon detection of the fact that the exposure process has been stopped for 60 seconds or longer, i.e., the first shutter for exposure time control has been in the closed state for 60 seconds or longer. The fact in which the first shutter for exposure time control has been in the closed state for 60 seconds or longer can be detected by checking the presence or absence of an open request at the timing when the closed state has continued for 60 seconds.

When the exposure process is continued and the feed of printing paper is performed intermittently, there is no fear of causing fogging even if the second shutter for light shielding is maintained opened for a relatively long period of time. Also, it is possible to minimize the time lag which is produced when the second shutter starts its opening operation after completion of a previous closing operation.

Figure 8:
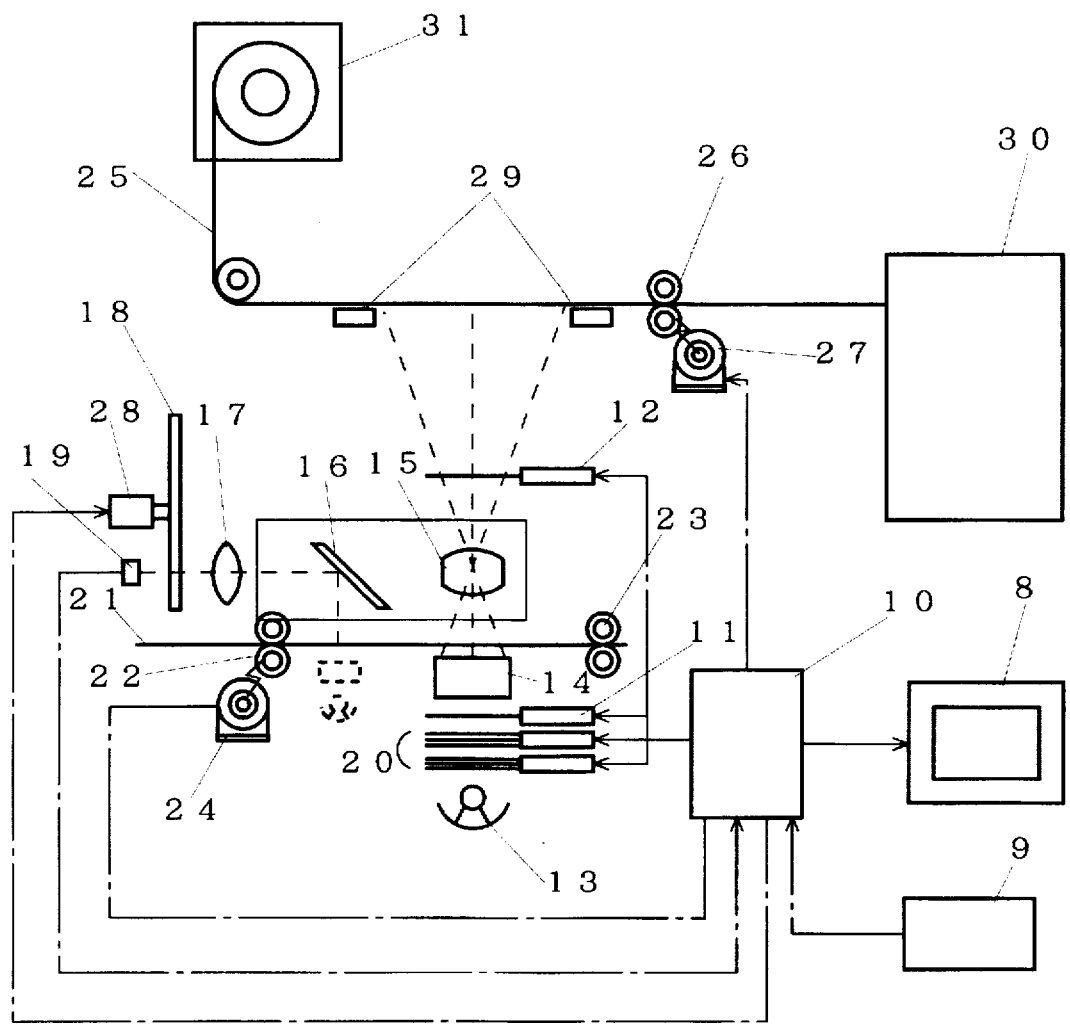
FIG. 8 is a diagram schematically showing the structure of a photographic printing apparatus according to a first embodiment of the present invention.

FIG. 8 is a diagram schematically showing the structure of a photographic printing apparatus according to a first embodiment of the present invention. A rolled printing paper 25 is accommodated in a paper magazine 31. The printing paper 25 is transported by rollers 26 driven by a motor 27, so that a part of the printing paper 25 is positioned on an exposure region while being held by a paper mask 29. After completion of exposure, the printing paper is fed to a developing section 30. In a light source section, filters 20 such as light adjustment filters and cut filters are disposed in the vicinity of a light source 13, and a first shutter 11 for exposure control is disposed between the filters 20 and a mirror tunnel 14. The filters 20 and the first shutter 11 are moved between an optical path region and a non-optical path region in response to signals from a controller 10.

A negative film 21 is transported by rollers 22 and 23 driven by a motor 24, so that an image frame of the negative film 21 is positioned within the optical path region. After completion of exposure, the negative film 21 is fed so as to position another frame within the optical path region. The mirror tunnel 14 is situated along the optical path between the first shutter 11 and the negative film 21. A lens 15 combined with a reflection mirror 16 is disposed along the optical path to be situated on downstream side of the negative film 21. When photometry is performed, the reflection mirror 16 is advanced into the optical path while the lens 15 is retracted from the optical path. The reflection mirror 16 receives light passing through the negative film 21 and reflects it to the lens 15. The reflected light passing through the lens 15 enters a CCD image sensor 19 via a rotary color filter 18. The CCD image sensor 19 supplies the controller 10 with an image signal obtained from the received light. The rotary color filter 18 is provided with color separation filters. These color separation filters are rotated by a motor 28 so as to be set successively in position.

A second shutter 12 for light shielding is disposed between the lens 15 and the printing paper, and operates in response to signals from the controller 10, like the motor 27 and the first shutter 11. The controller 10 also controls a monitor 8 which displays conditions of exposure process, photometry information and operation conditions of the photographic printing apparatus. The controller 10 is provided with various control means such the shutters of the photographic printing apparatus, an optical unit consisting of the lens 15 and the reflection mirror 16, the motor 27, and the CCD image sensor 19. The controller 10 receives inputs from an operation panel 9 and signals from various parts controlled by the controller 10 so as to monitor and control the operation.

Figure 9:
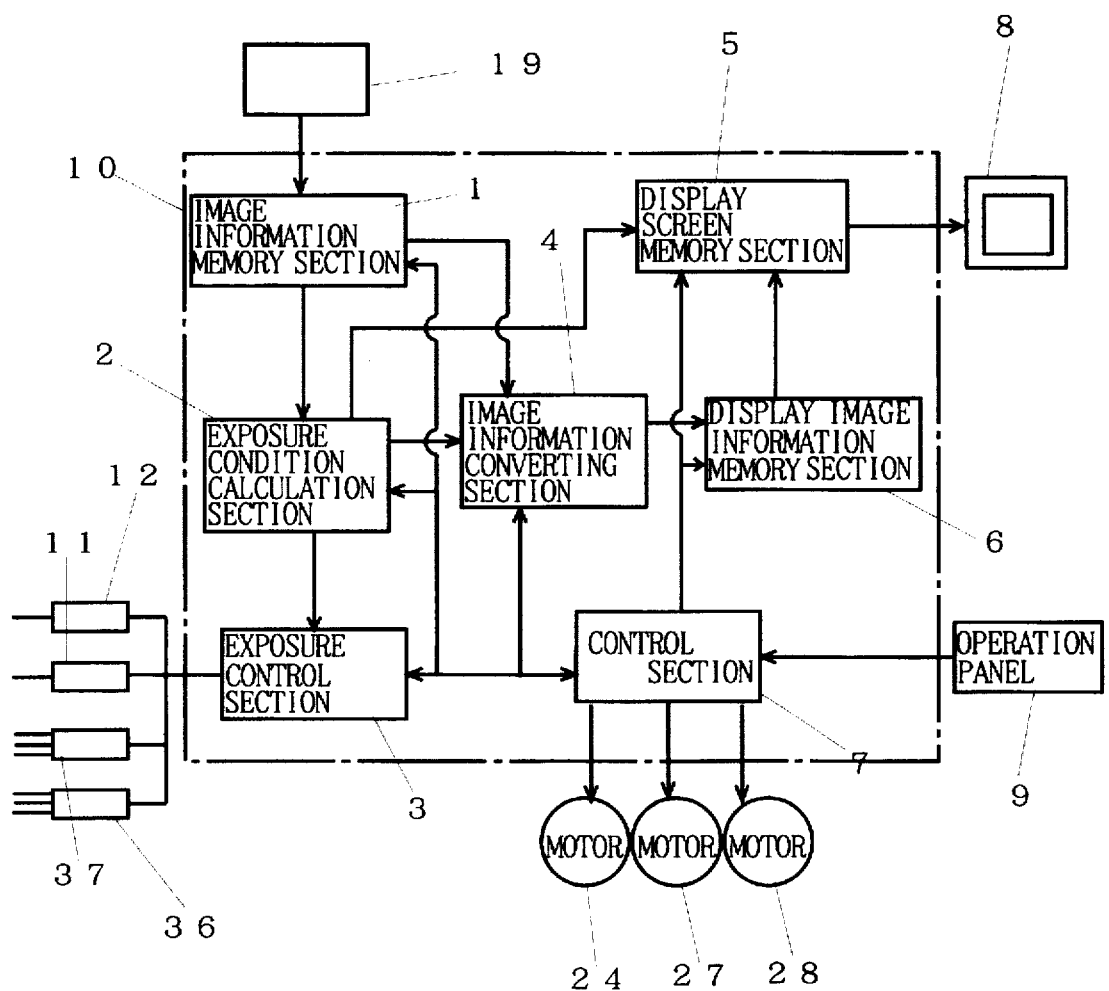
FIG. 9 is a block diagram schematically showing the structure of the controller of the photographic printing apparatus according to the first embodiment of the present invention.

FIG. 9 is a block diagram of the controller of the photographic printing apparatus according to the first embodiment of the present invention. The controller 10 mainly consists of an image information memory section 1, an exposure condition calculation section 2, an image information converting section 4, an exposure control section 3, a display screen memory section 5, a display image information memory section 6, and a control section 7. Since the CCD image sensor 19 is used for photometry in the present embodiment, image information on the negative film is sent to the image information memory section 1 as photometry data. In the exposure condition calculation section 2, a density, color densities, etc., are calculated from the photometry data, thereby determining exposure conditions. The exposure conditions thus obtained are fed to the exposure control section 3, the display screen memory section 5, and the image information converting section 4. The exposure control section 3 controls the opening/closing operations of the first and second shutters 11 and 12, and the movements of the light-adjustment filter 36 and the cut filter 37 in accordance with the exposure conditions. The exposure control section 3 exchanges signals with the control section 7, and also outputs control signals to the image information memory section 1, the exposure condition calculation section 2, and the image information converting section 4.

The image information converting section 4 converts image signals, which are sent from the image information memory section 1, the exposure condition calculation section 2, the control section 7, and the exposure control section 3, into display image information to be displayed on the display screen. The display image information is sent to the display image information memory section 6. The display screen memory section 5 combines information sent from the exposure condition calculation section 2 and the control section 7 with image information sent from the display image information memory section 6 and holds the combined information as display screen data. The display screen data held in the display screen memory section 5 are sent to the monitor 8, thereby obtaining a display screen output. The control section 7 receives an input from the operation panel 9 and sends command signals to various sections. The control section 7 also controls the motors 24, 27 and 28 for driving the printing paper, the negative film and the rotary color filter, respectively.

Figure 10:
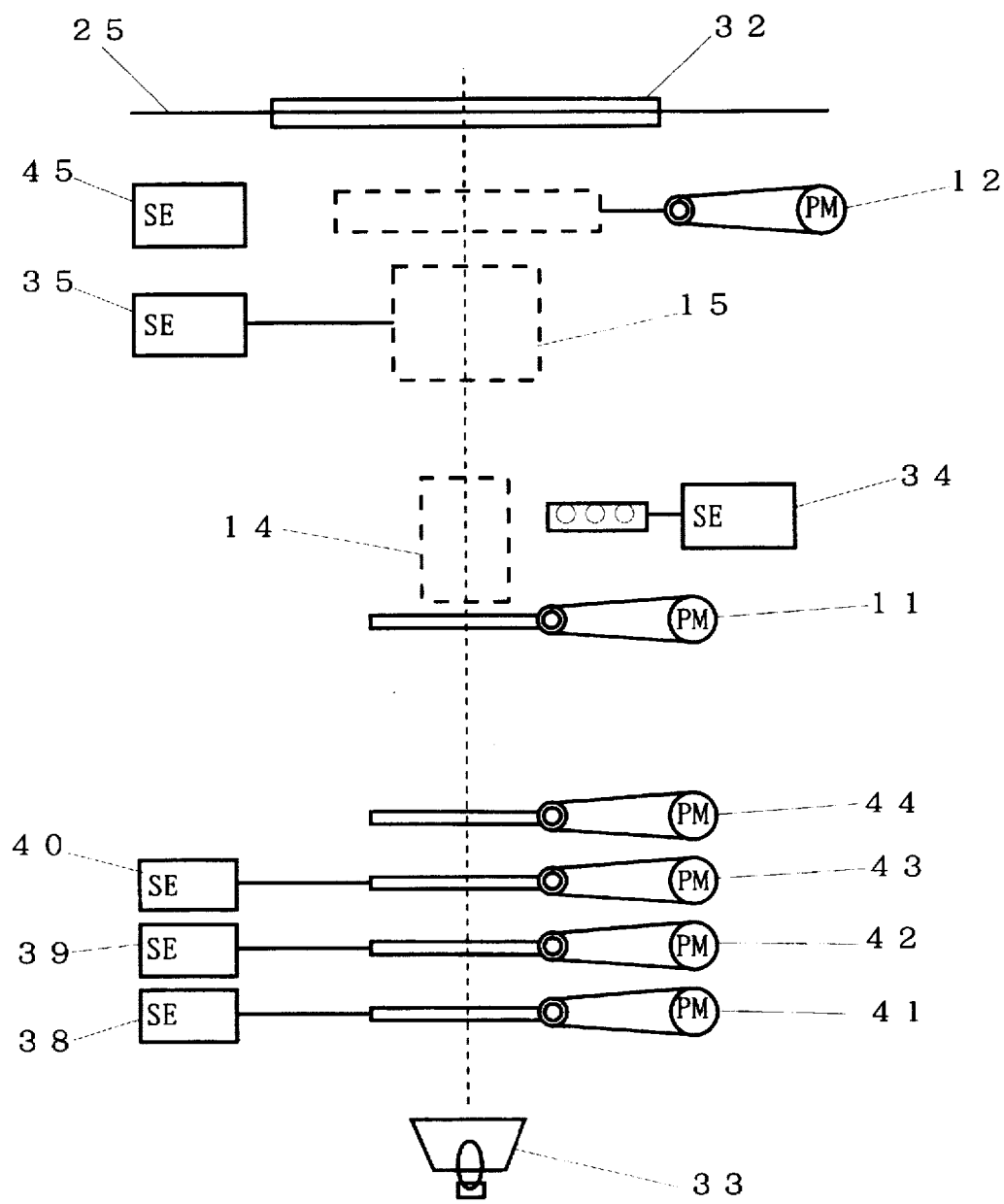
FIG. 10 is a schematic cross-sectional view showing the exposure section of the photographic printing apparatus according to the first embodiment of the present invention.

FIG. 10 is a schematic cross-sectional view showing the exposure section of the photographic printing apparatus according to the first embodiment of the present invention. In the vicinity of an exposure lamp 33 provided in the light source section, an yellow light-adjustment/cut filter 41, a magenta light-adjustment/cut filter 42, and a cyan light-adjustment/cut filter 43 are disposed along the optical path as cut filters. Further, a set-up filter 44 is disposed along the optical path as a light-adjustment filter. The light-adjustment/cut filters 41, 42 and 43 are provided with sensors 38, 39 and 40, respectively.

Moreover, the first shutter 11 for exposure time control and the mirror tunnel 14 are disposed along the optical path. A light-adjustment sensor 34 is provided in the vicinity of the mirror tunnel 14, and is retracted from the optical path. When the first shutter 11 is in the open state, the light, which is emitted from the light source and passes through the mirror tunnel 14, passes through the negative film 21. During photometry, the light is reflected by the reflection mirror so that the light enters the photometry sensor. When exposure is performed, the second shutter 12 is opened so as to project the light onto the printing paper. The light passing through the negative film 21 is irradiated onto the printing paper 25 placed on an exposure table 32 via the lens 15 provided with a lens code sensor 35, thereby performing printing. In the present embodiment, not only the cut filters and the first shutter but also the light-adjustment filter and the second shutter are driven by pulse motors. However, other drive means suitable for the required drive accuracy and speed may be used.

Figure 11:
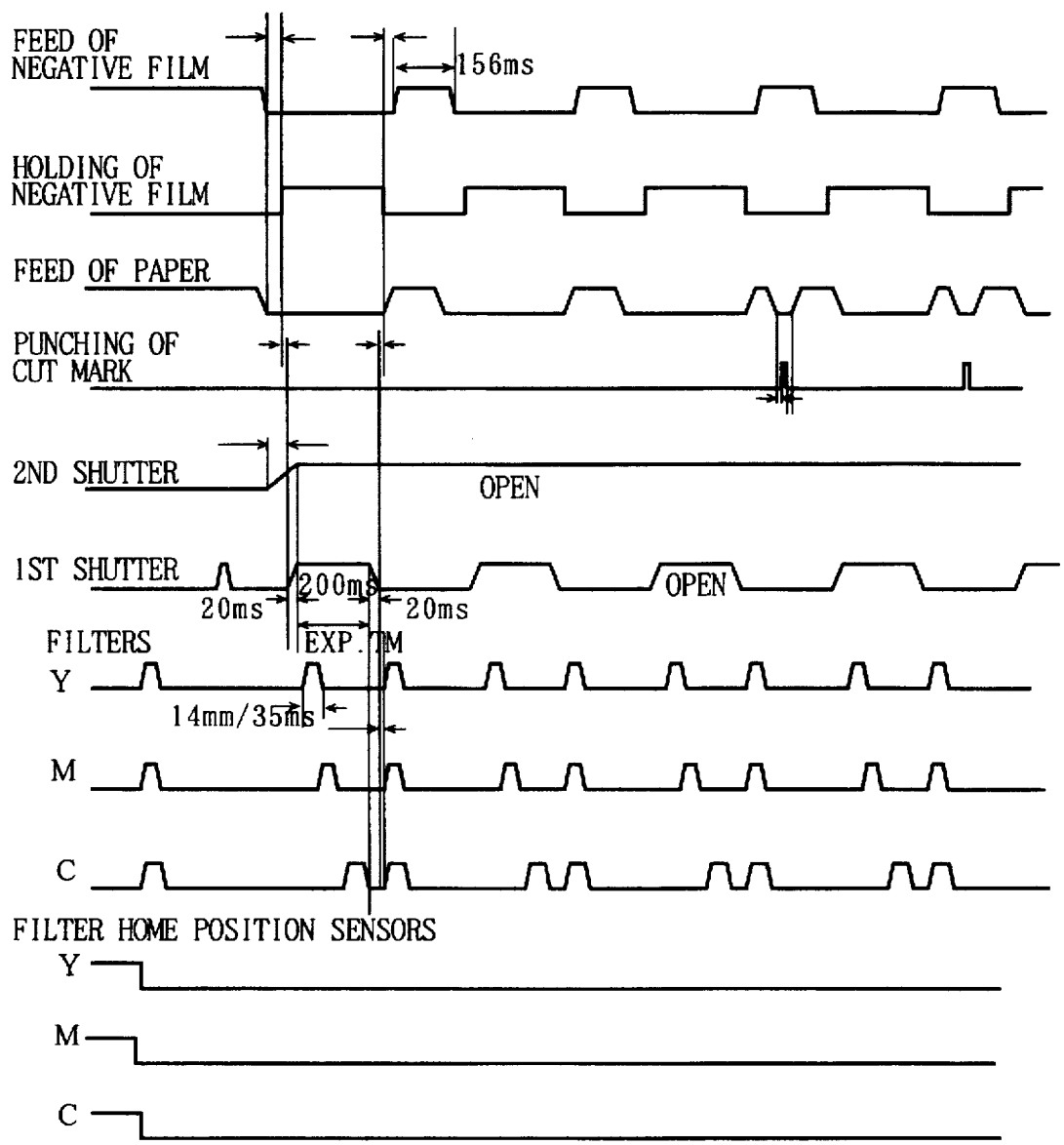
FIG. 11 is an operation chart showing the operation of the photographic printing apparatus according to the first embodiment of the present invention.

FIG. 11 is an operation chart showing the operation of the photographic printing apparatus according to the first embodiment of the present invention. In the present embodiment, the opening operations of the first and second shutters are performed at the same time, and then the second shutter is maintained opened. FIG. 11 shows the case where successive image frames of a negative film are continuously subjected to exposure, as in simultaneous printing.

When continuous exposure is performed, an image frame of the negative film to be printed is set to the negative film mask, and the printing paper is transported to be placed on the exposure table in a state in which at least second shutter for light shielding is in the closed state. In the present embodiment, during the continuous exposure, the period of time during which the feed of the negative film and the feed of the printing paper are performed with the second shutter in the closed state is utilized to check regularly whether or not the lamp is burned out. This is, the first shutter is opened for a short period of time, as shown at the beginning of the time chart for the first shatter, so as to check the burn out of the lamp.

The photographic printing apparatus of the present invention is provided with sensors (cut filter home position sensors) for detecting the light-adjustment/cut filters in the housing. The sensors are used to retract the light-adjustment/cut filters from the optical path as needed so as to accommodate them in the housing. As shown in the timing charts for the cut filter home position sensors, when the light-adjustment/cut filters in the housing are moved to dead heat positions before carrying out exposure, the sensors go into the off state. When the sensors go into the off state, the light-adjustment/cut filters of three colors are moved to the dead heat positions, as shown in the timing charts for the light-adjustment/cut filters. During exposure, the light-adjustment/cut filters are moved into the optical path.

The feed of a negative film in the present, embodiment is performed such that each frame takes 156 ms to be moved to the exposure region. Therefore, the time required to move the filters from the home positions or the optical path to the dead heat positions is set to be smaller than the frame feed time (156 ms). This eliminates useless operation time, thereby increasing the efficiency.

When the feed of the printing paper and the feed of the negative film are stopped at the same time, the opening operation of the second shutter is started. When a predetermined period of time has elapsed after the stoppage of the feed of the negative film, a negative film holder is operated. When a predetermined period of time has elapsed from the start of the operation of the negative film holder in the state where the second shutter is being opened, the opening operation of the first shutter is started.

The opening operation of the first shutter ends after 20 ms has elapsed after the start of the opening operation. For exposure, the first shutter is maintained opened for 200 ms. When the first shutter is in the open state, the light-adjustment/color filters are successively moved into the optical path. When the exposure time has elapsed, the closing operation of the first shutter is started.

When a predetermined period of time has elapsed after the closing operation of the first shutter, the light-adjustment/cut filters of three colors are moved to the dead heat potions. Also, the feed of the printing paper is started, and the pressing of the film by the negative film holder is stopped. When a predetermined period of time has elapsed after the above operation, the feed of the negative film is performed.

The above-described operation is repeated so as to perform continuous exposure. As shown in the latter half of the time chart for the paper feed, when a cut mark is punched in the printing paper, the feed of the printing paper is temporarily stopped, and a cut mark is formed after a predetermined period of time has elapsed after the stoppage of the paper feed. After the formation of the cut mark, the paper feed is resumed after a predetermined period of time has elapsed.

When exposure is performed after arbitrarily designating image frames of the negative film to be exposed or when continuous exposure is not performed, the second shutter is closed so as to provide light shielding, thereby protecting the printing paper. In this state, the lamp can be checked. When the instantaneous timings of the operations of various portions such as the opening/closing operations of the shutters, the feed and holding of the negative film, the feed of the printing paper, and the movement of the light-adjustment/cut filters are controlled accurately, the printing operation can be performed smoothly and quickly.

Figure 12:
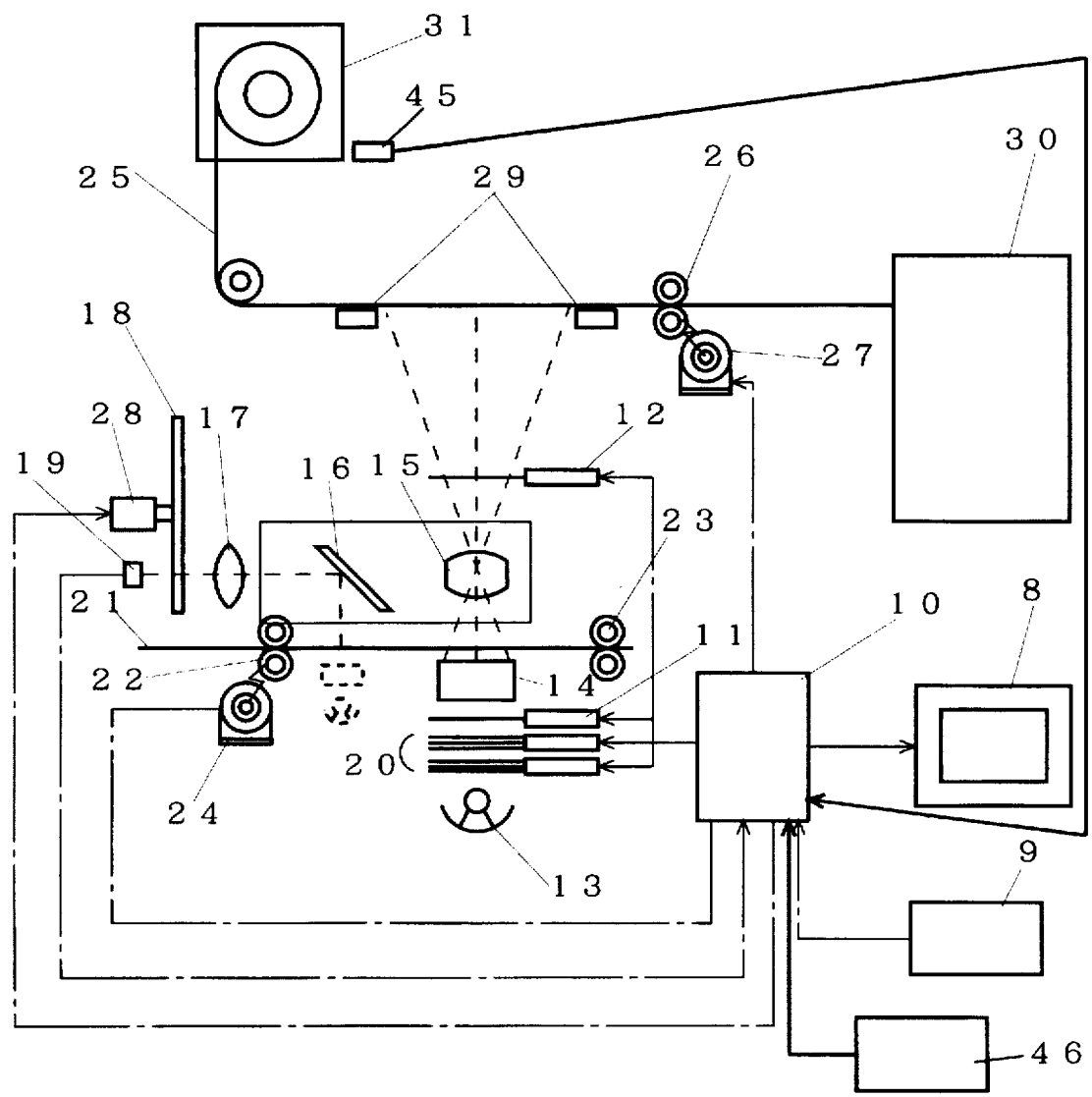
FIG. 12 is a diagram schematically showing the structure of a photographic printing apparatus according to a second embodiment of the present invention.

FIG. 12 is a diagram schematically showing the structure of a photographic printing apparatus according to a second embodiment of the present invention. A rolled printing paper 25 is accommodated in a paper magazine 31. The printing paper 25 is transported by rollers 26 driven by a motor 27, so that a part of the printing paper 25 is positioned on an exposure region while being held by a paper mask 29. After completion of exposure, the printing paper is fed to a developing section 30. In a light source section, filters 20 such as light adjustment filters and cut filters are disposed in the vicinity of a light source 13, and a first shutter 11 for exposure control is disposed between the filters 20 and a mirror tunnel 14. The filters 20 and the first shutter 11 are moved between an optical path region and a non-optical path region in response to signals from a controller 10.

A negative film 21 is transported by rollers 22 and 23 driven by a motor 24. The mirror tunnel 14 is situated along the optical path between the first shutter 11 and the negative film 21. A lens 15 combined with a reflection mirror 16 is disposed along the optical path to be situated on downstream side of the negative film 21. When photometry is performed, the reflection mirror 16 is advanced into the optical path while the lens 15 is retracted from the optical path. The reflection mirror 16 receives light passing through the negative film 21 and reflects it to the lens 15. The reflected light passing through the lens 15 then enters a CCD image sensor 19 via a rotary color filter 18. The CCD image sensor 19 supplies the controller 10 with an image signal obtained from the received light. The rotary color filter 18 is provided with color separation filters. These color separation filters are rotated by a motor 28 so as to be set successively in position.

A second shutter 12 for light shielding is disposed between the lens 15 and the printing paper, and operates in response to signals from the controller 10, like the motor 27 and the first shutter 11. The controller 10 also controls a monitor 8 which displays conditions of exposure process, photometry information and operation conditions of the photographic printing apparatus.

In the photographic printing apparatus according to the present embodiment, the controller 10 monitors the operation of the first shutter 11, and closes the second shutter 12 when the first shutter 11 is continuously in the closed state for a predetermined period of time or longer. A detecting device 45 for detecting the kind of photosensitive material is provided inside or outside of the paper magazine 31, and an environment measuring apparatus 46 such as an illuminance meter is provided in the photographic printing apparatus. Although the above-described predetermined period of time may be fixedly set to 60 seconds, it is preferable to determine the above predetermined period of time based on information which is obtained by the detecting device 45 for detecting the kind of photosensitive material and the environment measuring apparatus 46 and is fed to the controller, such that the predetermined period of time matches the characteristics of the photosensitive material and the installation environment. The controller 10 is provided with various control means such the shutters of the photographic printing apparatus, an optical unit consisting of the lens 15 and the reflection mirror 16, the motor 27, and the CCD image sensor 19. The controller 10 receives inputs from an operation panel 9 and signals from various parts controlled by the controller 10 so as to monitor and control the operation.

Figure 13:
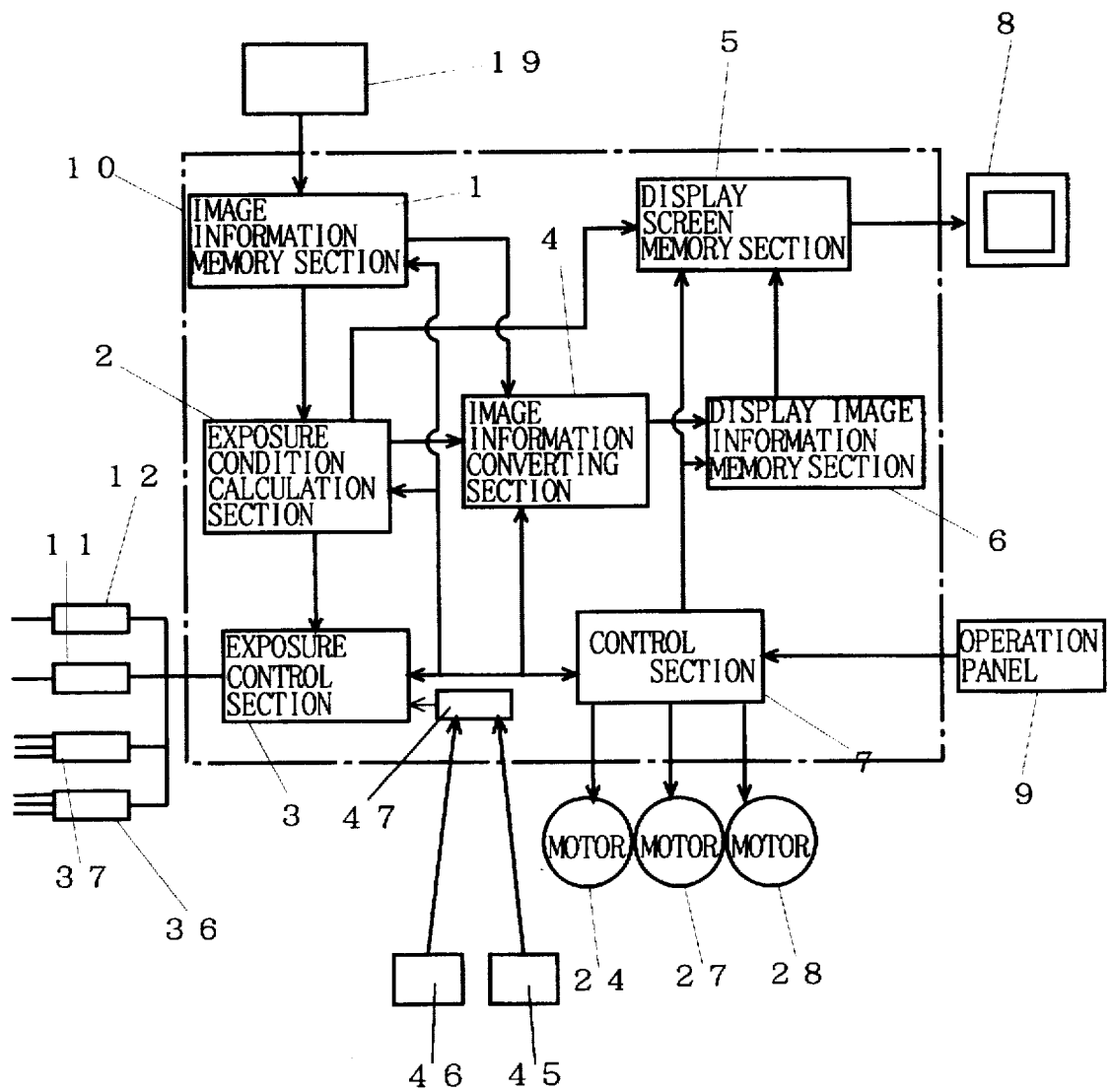
FIG. 13 is a block diagram schematically showing the structure of the controller of the photographic printing apparatus according to the second embodiment of the present invention.

FIG. 13 is a block diagram of the controller of the photographic printing apparatus according to the second embodiment of the present invention. The controller 10 mainly consists of an image information memory section 1, an exposure condition calculation section 2, an image information converting section 4, an exposure control section 3, a display screen memory section 5, a display image information memory section 6, and a control section 7, as in the first embodiment. In addition to these sections, a second shutter closing time determining section 47 is provided. Since the CCD image sensor 19 is used for photometry in the present embodiment, image information on the negative film is sent to the image information memory section 1 as photometry data. In the exposure condition calculation section 2, a density, color densities, etc., are calculated from the photometry data, thereby determining exposure conditions.

The exposure conditions thus obtained are fed to the exposure control section 3, the display screen memory section 5, and the image information converting section 4. The exposure control section 3 controls the opening/closing operations of the first and second shutters 11 and 12, and the movements of the light-adjustment filter 36 and the cut filter 37 in accordance with the exposure conditions. The exposure control section 3 also closes the second shutter 12 when the first shutter 11 is continuously in the closed state for 60 seconds and more. The exposure control section 3 exchanges signals with the control section 7, and also outputs control signals to the image information memory section 1, the exposure condition calculation section 2, and the image information converting section 4.

The second shutter closing time determining section 47 determines operating conditions for the closing operation of the second shutter based on the information sent from the detecting device 45 for detecting the kind of photosensitive material and the environment measuring apparatus 46, and sends it to the exposure control section 3. From the sensitivity of the printing paper and the environment in which the apparatus is installed, a limit exposure time in which the photosensitive material is not affected by light to an undesired level is determined. Based on the limit exposure time, the above-mentioned predetermined period of time, which is a period in which the second shutter can be maintained opened, is determined. When the first shutter is continuously in the closed state for the predetermined period of time, i.e., when the exposure process is stopped for the predetermined period of time, the exposure control section 3 starts the closing operation of the second shutter, thereby preventing the occurrence of undesired fogging.

The image information converting section 4 converts image signals, which are sent from the image information memory section 1, the exposure condition calculation section 2, the control section 7, and the exposure control section 3, into display image information to be displayed on the display screen. The display image information is sent to the display image information memory section 6. The display screen memory section 5 combines information sent from the exposure condition calculation section 2 and the control section 7 with image information sent from the display image information memory section 6 and holds the combined information as display screen data. The display screen data held in the display screen memory section 5 are sent to the monitor 8, thereby obtaining a display screen output. The control section 7 receives an input from the operation panel 9 and sends command signals to various sections. The control section 7 also controls the motors 24, 27 and 28 for driving the printing paper, the negative film and the rotary color filter, respectively.

Figure 14:
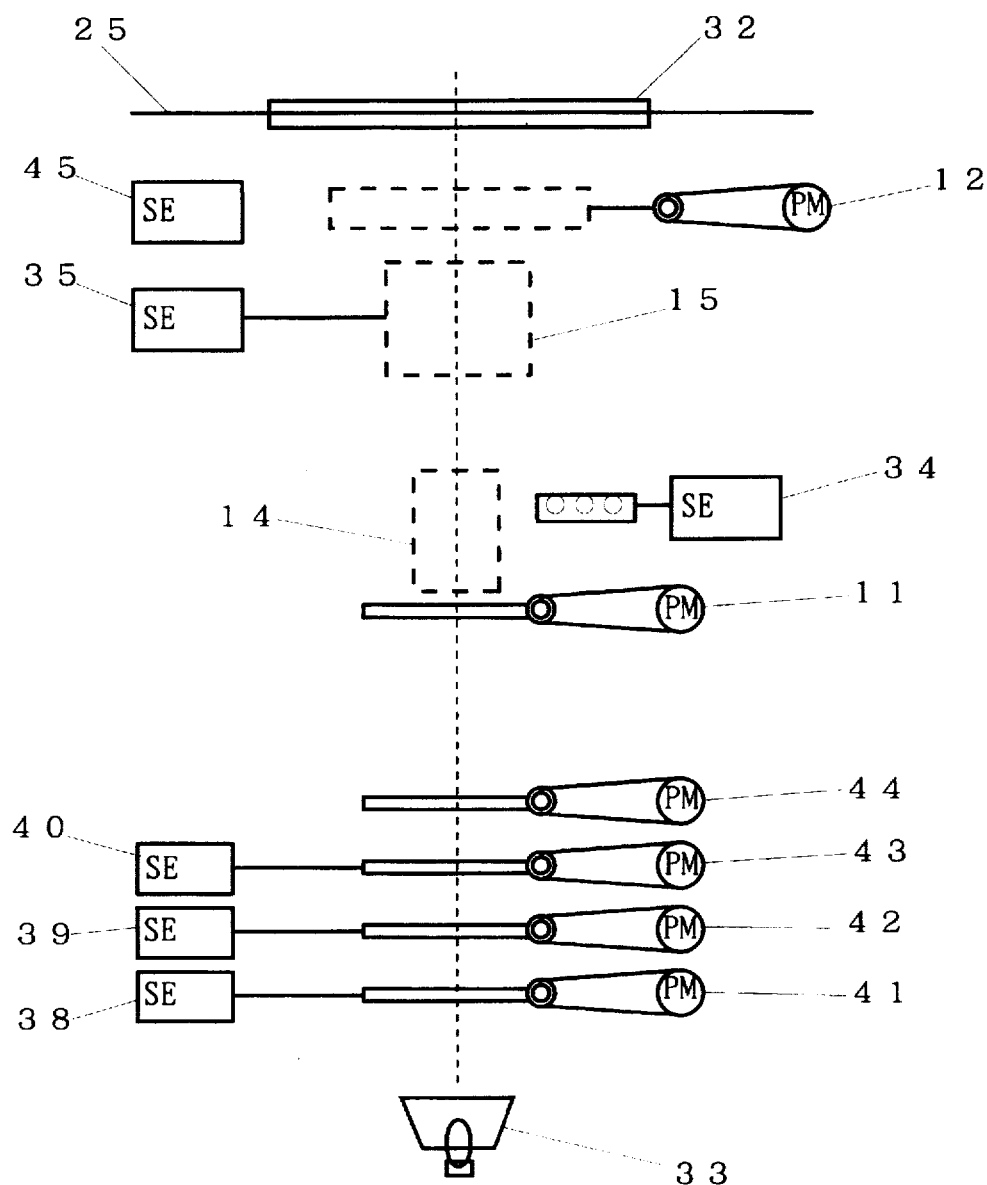
FIG. 14 is a schematic cross-sectional view showing the exposure section of the photographic printing apparatus according to the second embodiment of the present invention.

FIG. 14 is a schematic cross-sectional view showing the exposure section of the photographic printing apparatus according to the second embodiment of the present invention. In the vicinity of an exposure lamp 33 provided in the light source section, an yellow light-adjustment/cut filter 41, a magenta light-adjustment/cut filter 42, and a cyan light-adjustment/cut filter 43 are disposed along the optical path as cut filters. Further, a set-up filter 44 is disposed along the optical path as a light-adjustment filter. The light-adjustment/cut filters 41, 42 and 43 are provided with sensors 38, 39 and 40, respectively.

Moreover, the first shutter 11 for exposure time control and the mirror tunnel 14 are disposed along the optical path. A light-adjustment sensor 34 is provided in the vicinity of the mirror tunnel 14, and is retracted from the optical path. When the first shutter 11 is in the open state, the light, which is emitted from the light source and passes through the mirror tunnel 14, passes through the negative film 21. During photometry, the light is reflected by the reflection mirror so that the light enters the photometry sensor 34. When exposure is performed, the second shutter 12 is opened so as to project the light onto the printing paper. The light passing through the negative film 21 is irradiated onto the printing paper 25 placed on an exposure table 32 via the lens 15 provided with a lens code sensor 35, thereby performing printing. In the present embodiment, not only the cut filters and the first shutter but also the light-adjustment filter and the second shutter are driven by pulse motors. However, other drive means suitable for the required drive accuracy and speed may be used.

In the photographic printing apparatus according to the present invention, since the opening/closing operations of the first shutter and the opening/closing operations of the second shutter are controlled independently, the second shutter can be opened and closed freely. The operation of the photographic printing apparatus of the present invention is not limited to the above-described operation in which the second shutter for light shielding is closed when the first shutter for exposure time control is continuously in the closed state for 60 seconds, or a predetermined period of time or longer. The photograph printing apparatus may be modified to include both the control means of the second embodiment and the control means of the first embodiment and so as to selectively operate them. For example, when a highly sensitive printing paper is used, the control means of the first embodiment is selected so as to complete the opening operations of the first and second shutters at the same time and start the closing operations of the first and second shutters at the same time.

Obviously, numerous modifications and variations of the present invention are possible in light of the above teachings. It is therefore to be understood that within the scope of the appended claims, the present invention may be practiced otherwise than as specifically described herein.

What is claimed is:

1. A photographic printing apparatus comprising:

a light source for exposure;

an optical unit for projecting an image carried on a negative film onto a photosensitive material at a predetermined magnification;

a first shutter for exposure time control disposed between said light source and said negative film;

a second shutter for light shielding disposed between said optical unit and said photosensitive material; and control means for controlling said first and second shutters such that their opening operations end simultaneously and their closing operations start simultaneously.

2. A photographic printing apparatus comprising:

a light source for exposure;

an optical unit for projecting an image carried on a negative film onto a photosensitive material at a predetermined magnification;

a first shutter for exposure time control disposed between said light source and said negative film;

a second shutter for light shielding disposed between said optical unit and said photosensitive material; and control means for controlling said first and second shutters such that said second shutter is closed when said first shutter continues its closed state for a predetermined period of time.

3. A photographic printing apparatus comprising:

a light source for exposure;

an optical unit for projecting an image carried on a negative film onto a photosensitive material at a predetermined magnification;

a first shutter for exposure time control disposed between said light source and said negative film;

a second shutter for light shielding disposed between said optical unit and said photosensitive material;

first control means for completing opening operations of said first and second shutters simultaneously and for starting closing operations of said first and second shutters simultaneously; and second control means for closing said second shutter when said first shutter continues its closed state for a predetermined period of time.

4. A photographic printing apparatus according to claim 2, wherein said second shutter is closed when said first shutter continues its closed state for 60 second.

5. A photographic printing apparatus according to claim 3, wherein said second shutter is closed when said first shutter continues its closed state for 60 second.

6. A photographic printing apparatus comprising:

a light source for exposure;

an optical unit for projecting an image carried on a negative film onto a photosensitive material at a predetermined magnification;

a first shutter for exposure time control disposed between said light source and said negative film;

a second shutter for light shielding disposed between said optical unit and said photosensitive material;

control means for controlling said first and second shutters such that said second shutter is closed when said first shutter continues its closed state for a predetermined period of time; and setting means for setting said predetermined period of time.

7. A photographic printing apparatus according to claim 6, wherein said setting means comprises:

means for measuring environment in which said photographic printing apparatus is installed; and means for determining said predetermined period of time based on a measurement obtained by said measuring means.

8. A photographic printing apparatus according to claim 7, wherein said setting means comprises an illuminance meter.

9. A photographic printing apparatus according to claim 6, wherein said setting means comprises:

means for detecting the kind of said photosensitive material; and means for determining said predetermined period of time based on the kind of said photosensitive material obtained by said detecting means.

10. A photographic printing apparatus according to claim 6, wherein said setting means comprises:

means for measuring environment in which said photographic printing apparatus is installed;

means for detecting the kind of said photosensitive material; and means for determining said predetermined period of time based on a measurement obtained by said measuring means and on the kind of said photosensitive material obtained by said detecting means.

* * * * *